July 4, 1950 F. V. ATKESON Re. 23,245
METHOD OF FRACTIONATING VAPORS
Original Filed May 10, 1941
FIG. 1.
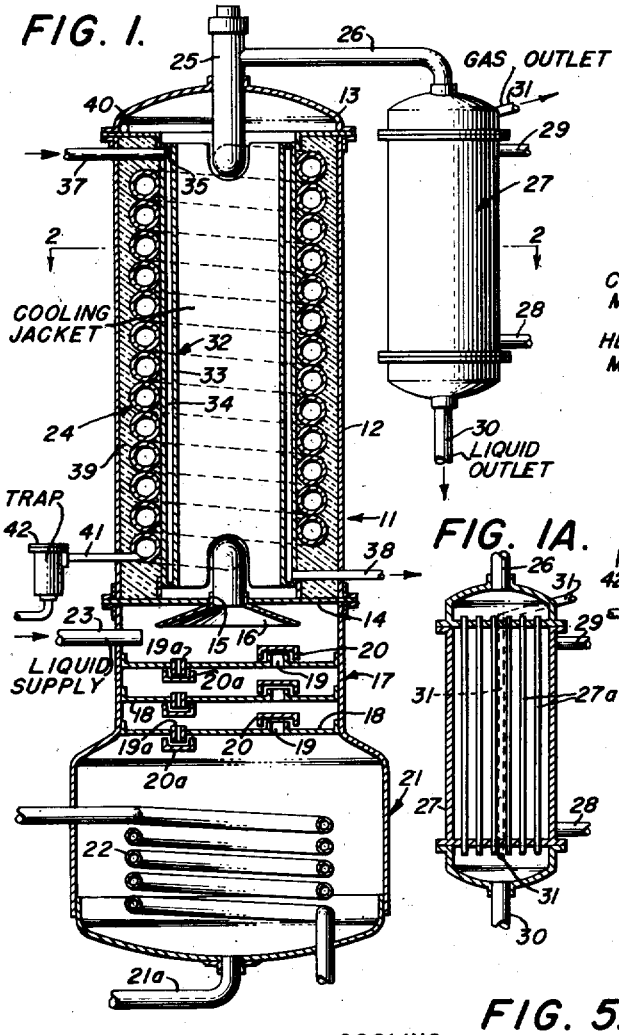
FIG. 3.
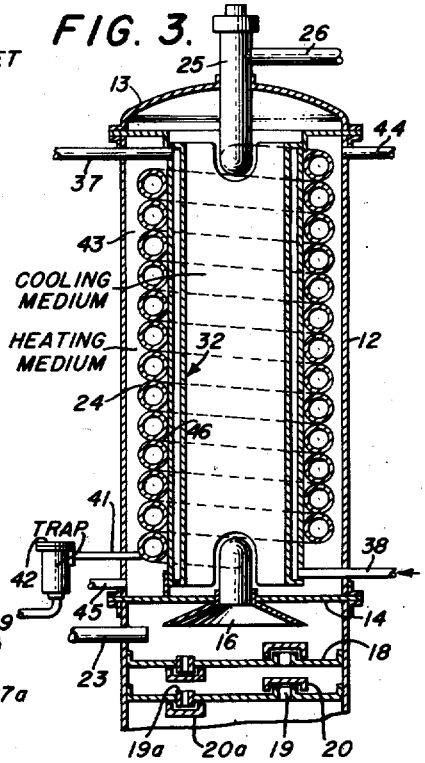
FIG. 1A.
FIG. 4.
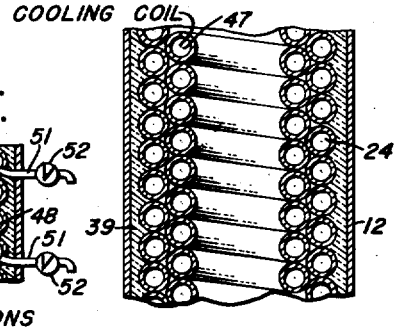
FIG. 5.
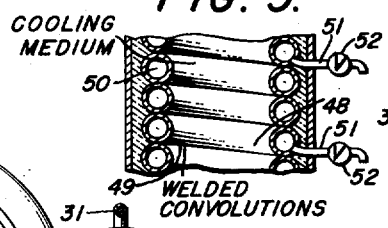
FIG. 2.
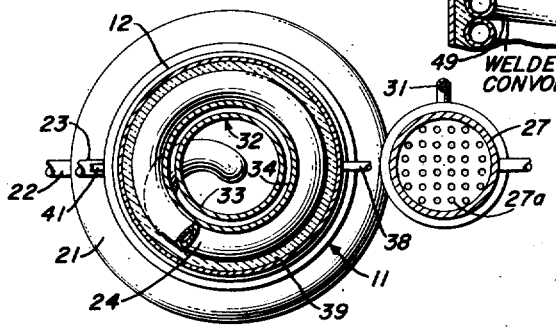
INVENTOR
FLORIAN V. ATKESON.
BY Green, McCallister and Miller
ATTORNEYS Reissued July 4, 1950

Re. 23,245

UNITED STATES PATENT OFFICE 23,245

METHOD OF FRACTIONATING VAPORS

Florian V. Atkeson, Springdale, Pa.

Original No. 2,330,326, dated September 28, 1943, Serial No. 392,932, May 10, 1941. Application for reissue August 7, 1947, Serial No. 767,147

7 Claims. (Cl. 257—51)

Matter enclosed in heavy brackets [ ] appears in the original patent but forms no part of this reissue specification; matter printed in italics indicates the additions made by reissue

My invention relates to a method of and apparatus for fractionating vapors. While my invention is capable of application to the separation of any mixture of vapors of different molecular weights *and/or different physical properties*, it finds particular utility in the fractionation of hydrocarbon vapors, and for illustrative purposes its application to such use is hereinafter described without limiting the invention to such application.

The objects of my invention include a substantial increase, within a compact apparatus of small size, of the area of contact of reflux liquid with the vapors during fractionation and a substantial increase in the surface area of the apparatus at a different temperature from the vapors and contacted by the vapors as compared with the conventional fractionating apparatus, such as a bubble tower.

Another object of my invention is the easier control of the temperature gradient during fractionation of a mixture of vapors, which my invention contemplates providing by defining a long path of travel for the vapors within a compact apparatus and by subjecting each cross section of the stream of the mixture of vapors to a temperature gradient facilitating their selective condensation.

Another object of my invention is to provide a method of and apparatus for accurately and completely condensing selectively a mixture of vapors having condensing points differing only slightly.

Another purpose of my invention is the provision of a method of and apparatus for fractionally [condensing] *distilling* a mixture of vapors of different condensing *or boiling* points either in one apparatus, from which condensates of different condensing points are withdrawn at different levels, or in a plurality of devices, through which the vapor mixture *in liquid form* is passed successively and from each of which a condensate having a predetermined *condensing point or* range of condensing points is withdrawn *or separated.*

Other objects of my invention include the provision of an apparatus for fractionating vapors of different condensing points which is compact in size and inexpensive in manufacture.

Embodiments of my invention capable of performing these objects and providing these advantages and others are described in the following specification, which may be more readily understood by reference to the accompanying drawing in which:

Figure 1 is a vertical sectional view of one embodiment of my invention; *Figure 1A is a reduced vertical section of a conventional condenser shown in Figure 1;*

Figure 2 is a horizontal sectional view taken as indicated by the line 2—2 of Figure 1; and Figures 3, 4 and 5 are fragmentary vertical sectional views of other forms of my invention.

Referring to the [drawing] *drawings*, which [is] *are* for illustrative purposes only, the numeral 11 indicates a fractionating apparatus which includes a tower 12, having a domed top 13, and a bottom plate 14 having a central opening 15 communicating through a depending baffle 16 with a bubble plate chamber 17. The bubble plate chamber 17 is provided with a plurality of bubble plates 18, illustrated as three in number, each of which includes an upwardly projecting vapor pipe 19 with a cap 20 positioned over the upper end thereof and extending downwardly therearound to adjacent the upper surface of the bubble plate 18, so that vapors passing upwardly through the pipe 19 are directed downwardly through liquid upon the bubble plate 18 before continuing their passage upwardly to the tower 12. Each bubble plate 18 is provided with a liquid pipe 19a having a cap 20a for passing liquid downwardly therethrough, the bubble plates 18 acting to smooth out the flow of vapors before the vapors enter the tower 12, [making the rate of passage of the vapors through the tower more uniform and limiting the vapors entering the tower to those having the desired range of condensing temperatures.]

The fractionating apparatus 11 includes also a kettle or still 21 positioned below and communicating with the bubble plate chamber 17. The still 21 may be heated in any suitable manner, as for example, by a steam coil 22, and is provided with an outlet pipe 21a in the bottom thereof for withdrawing residue therefrom, *or for connection to conventional sump tanks or another fractionating apparatus corresponding to apparatus 11.* A liquid supply pipe 23 is provided for supplying liquid to the still 21 for vaporization therein and may be connected to the bubble plate chamber 17 above the [lowermost] *uppermost* of the bubble plates 18, so that the incoming liquid oil exerts a reflux action upon the upwardly traveling vapors from the still 21.

Provided within the tower 12 is a [vapor] *flow* line in the form of a coil [of] pipe 24 of metal of good heat conductivity such, for example, as copper. The coil 24 is formed so that adjacent convolutions are in contact with each other and so that its lower end communicates with the central opening 15 of the bottom plate 14 of the tower 12. The upper end of the coil 24 is connected to a riser pipe 25 which communicates through a pipe 26 with a condenser 27 of conventional construction or another fractionating device similar to the fractionating device 11.

Positioned within the tower 12 with its outer wall in contact with the coil 24 is a cooling jacket 32 annular in cross section and including an inner wall 33, an outer wall 34, and top and bottom walls 35 and 36, respectively. An inlet pipe 37 extends through the wall of the tower 12 and communicates with the cooling jacket 32 near the upper end wall 35, and an outlet pipe 38 communicates with the cooling jacket 32 adjacent the lower end wall 36.

The coil 24 is formed so that its external diameter is substantially less than the internal diameter of the tower 12, and the space between the vertical coil 24 and the wall of the tower 12 is filled with a heat insulating material 39 extending from the bottom plate 14 of the tower 12 to a top plate 40 which extends between the upper end of the cooling jacket 32 and the periphery of the domed cover 13.

As illustrated, the condenser 27 includes inlet and outlet pipes 28 and 29, respectively, for supplying a cooling medium around a plurality of vapor pipes within the condenser 27, an outlet pipe 30 for withdrawing the liquid condensate therefrom, and an outlet pipe 31 for withdrawing from the condenser any uncondensable gases.

In performing the method of my invention with the apparatus described, the liquid to be fractionated is introduced through the inlet pipe 23 and passes downwardly through the bubble plates 18 to the still 21, where it is vaporized by the heat provided by the steam coil 22. The vapors pass upwardly through the vapor pipes 19 in the bubble plates 18, under the bubble caps 20 and through the liquid upon the upper surface of the bubble plates 18, thus intimately commingling with the liquid. [This commingling of the vapors with the liquid serves to condense and lead, with the incoming liquid to the still 21, vapors of the hydrocarbons of high condensing points, and serves also to preheat the incoming liquid before it reaches the still 21.] *This serves to preheat the incoming liquid and to strip out low boiling components by heat-exchange before the incoming liquid reaches the still 21.*

From the bubble plate chamber 17 the vapors *or gases* pass upwardly through the baffle 16 into the lower end of the coil 24. The vapors *or gases* entering the coil 24 consist of a mixture of hydrocarbons of different condensing points. As this *gas* mixture passes upwardly through the coil 24, it is subjected to a cooling action by the liquid in the cooling jacket 32. The outer wall 34 of the cooling jacket 32 being in intimate contact with the inner surface of the coil 24 and, if desired, the space between each pair of adjacent turns of the coil 24 and such outer wall 34 being filled with a suitable metal of high conductivity, the cooling liquid within the jacket 32 is maintained in intimate heat conducting relationship with the vapors *or gases* ascending in the coil 24.

It is to be noted that as the stream of vapors [passes] *pass* upwardly within the coil 24, the portions thereof adjacent the inner side of the coil 24 are subjected to a cooling action by the liquid in the jacket 32, while those portions of the vapors adjacent the outer side of the coil 24 are ot [subjected] *subject* to this cooling action but are prevented from cooling by the heat insulating material 39. Thus at every cross section of the stream of vapors in the coil 24, there is established a temperature gradient diametrically across the stream with the vapors on the inner side of the stream being cooled more than the vapors on the outer side of the stream.

The temperature and rate of passage of the cooling medium through the cooling jacket [are] *may be* adjusted so that vapors of a desired condensing point or range of condensing points are condensed by the passage of the mixture of vapors through the coil 24 *or that the liquid of low boiling point (low condensing point) or range passes while still in vapor or gaseous form upwardly out of the coil and into a conventional condenser, such as 27* [the] *The* condensate [being] *is* either withdrawn through a condensate withdrawal pipe 41 connected through a suitable trap 42 with the coil 24 adjacent its lower end or returned through the bubble plates 18 to the still 21, as may be desired. The trap 42 may be of any desired construction, such as a float controlled valve or stream trap, passing liquid therethrough but preventing the passage of vapor therethrough.

As the vapors condense upon the inner side of the wall 24, the condensate flows downwardly therethrough in a thin film. The surface upon which the vapors thus condense is made extremely large by virtue of the shape of the apparatus described. For example, in a coil of a three foot diameter comprising forty turns of pipe with a six inch internal diameter, there are presented approximately 570 square feet of surface for contact by the vapors. The condensate flowing downwardly in a thin film on the inner side of the coil 24, is, throughout its travel in the coil, in intimate contact with [and commingled with] the ascending vapors. This intimate [commingling] *contact* of the descending reflux condensate and the ascending vapors insures an exchange between them, so that the lower boiling fractions of the liquid condensate are vaporized and the higher boiling fractions of the vapor are condensed within the coil 24. Since the path of travel of the vapors is very long within the tower 12, the temperature gradient longitudinally within the coil can be made very gradual, and a most accurate separation of the vapors can be achieved.

Tests of the method of my invention performed by apparatus such as described demonstrate a very accurate and complete separation of a mixture of hydrocarbon vapors of condensing points differing but slightly from each other. It is my belief that this is in part due to the fact that, in accordance with my invention, the vapors are passed in a spiral path, and a *relatively sharp* temperature gradient across each part of the path is maintained with the temperature of the vapors on the inner side of the spiral path or stream at a lesser value than the temperature of the vapors on the outer side of the spiral path or stream.

[While I do not desire to be restricted to the theories herein set forth, it is my belief that the accurate fractionation in accordance with my invention of a mixture of vapors of condensing points differing but slightly from each other is at least in part due to action in accordance with one or both of the above stated theories.]

In Figure 3 there is illustrated an alternative embodiment of my invention in which the parts like those previously described are identified by like numbers. This embodiment of my invention differs from the embodiment illustrated in Figures 1 and 2 in that the insulating material 39 is omitted, and there is provided around the coil 24 and within the tower 12 a heating medium 43. The heating medium 43 may be of any desired material, such as steam, and is circulated through the tower 12 in intimate contact with the outer surface of the coil 24 by an inlet pipe 44 and an outlet pipe 45.

In many applications of my invention, such as the embodiment illustrated in Figure 3, the supplying of heat to the outer surface of the coil 24 establishes a sharper temperature gradient across the coil and provides improved separation of the vapors. In this embodiment of my invention, as in that previously described, the heat conducting relationship of the cooling jacket 32 with the coil 24 may be improved by filling the spaces between them, indicated by the numeral 46, with a material of high heat conductivity, such as a suitable metal.

The embodiment of my invention illustrated in Figure 4 differs from the embodiment illustrated in Figure 1 in that there is substituted for the cooling jacket 32 of the form shown in Figure 1 a cooling coil 47, each convolution of which is positioned between and in contact with two convolutions of the vapor coil 24, so that each convolution of the coil 47 is in heat transferring relationship with two convolutions of the vapor coil 24.

In the form of apparatus of my invention illustrated in Figure 5, adjacent convolutions of a coil 48 for vapors are connected in fluid-tight relationship as by welding 49, the whole of the space 50 within the coil 48 being available for the circulation of a cooling medium. *Liquid outlet lines or taps 51 are shown provided with shut off valves 52.*

The still 21 and the bubble plate chamber 17 may be constructed separately from the tower 12 and separate from each other without departing from my invention. Likewise, there may be substituted for the bubble plates 18 in the chamber 17 other means of smoothing out the flow of vapors [such as Raschig rings, fuller's earth, bauxite, iron turnings, etc.]

Further, a plurality of liquid outlet lines may be connected to the coil at different levels, each withdrawing the condensate of vapors having a definite condensing point or range of condensing points, *see Figure 5, for example.*

From the foregoing, it will be seen that the method of my invention contemplates the passage of a mixture of vapors of different condensing points in a curved path so that each section of the stream has a temperature gradient thereacross with the lower temperature at the inner side of the curved path or stream and the higher temperature at the outer side, and with a temperature gradient along the stream with the higher temperature at the source of the stream and the [commingling] *contact* of the reflux condensate with the vapors along the walls defining the curved path of the stream through the length of the stream. It will also be seen that my invention contemplates the selective condensation of a [liquid which] *substance or substances in liquid form from a vapor or gaseous phase which substance or substances* may be a mixture of hydrocarbons all of which boil within *more* narrow temperature limits *than a mixture of gases or vapors from which they are condensed; or, would* ordinarily be defined as having a *more* narrow boiling point range [from] *than* [a] *the* mixture of gases *or vapors* which contains [said liquid] *the substance or substances* in [its] *a* gaseous *or vapor* phase. The [the] initial mixture, of course, [having] *has* a wider boiling point range than [the liquid but which includes that of the liquid, that] that *of individual substances which make up its content. The* portion of the mixture which is not so condensed [passing] *passes* through the process as a gas *or vapor.*

In the process illustrated and described, the condensation takes place in a helical passage which is provided by the pipe coil, and the condensation takes place [wholly] *substantially* upon the inner wall *portion* of the helix formed by the coil, that is, upon the wall *portion* nearest the axis of the helix, due to the fact that this inner portion of the wall is cooled below the temperature of the remainder of the wall, or, what amounts to the same thing, the remainder of the wall is hotter than the condensing surface thereof.

Various modifications of the method and apparatus of my invention will occur to those skilled in the art, and my invention must be understood therefore as not restricted to the embodiments, steps, or applications [hereinbefore] *herein* specifically set forth.

*In accordance with one theory, the heavier molecules of the vapors of higher boiling point travel slower on the average than the lighter molecules of the vapors of lower boiling point. Since the force upon molecules in a vapor mixture within the coil 24 is proportional to the square of their individual and separate velocities, I have reason to believe that the lighter molecules of the vapors of lower condensing point are moved by molecular force action to the outer portion of the spiral stream of vapors and that the heavier molecules of vapors or gases of higher condensing point thus tend to concentrate adjacent the inner side of the spiral stream. It will appear that such a concentration serves to increase the number of contacts of the molecules of the latter type with the cooler inner surface of the coil 24 and thus to facilitate their selective condensation. It is my belief that such an effect will be accomplished when the greatest velocity component of such molecules is in the direction of travel of the vapors or gases, or exactly opposite thereto, which condition, because of the random motion of the molecules, may be present over only a fraction of the paths of the separate molecules. It is also believed that where the action is nullified by the random motion of the molecules, condensation of the lighter molecules colliding with the inner cooler surface is inhibited by their greater energy of motion and their lower condensing temperature.*

*I also believe that since the lighter molecules of the vapors of lower boiling points have velocities greater than the velocities of the heavier molecules of the vapors of higher boiling points that the former will strike the outer, hotter wall of the coil a proportionately greater number of times in their travel therealong than the latter molecules. Hence, it appears that the lighter molecules will absorb heat energy from contact with such outer wall at a greater rate than the heavier molecules, thus causing a concentration of the heavier molecules by mass action adjacent the inner cooled surface of the coil 24.*

*From the gas laws it is known that the average velocities of the molecules are inversely proportional to their molecular weights, and as a result, it is believed that the lighter molecules will be traveling faster than the heavier ones in the* spiral coil which leads to a molecular force effect that is exactly opposite that of a normal centrifuge. In a centrifuge, liquid molecules are all traveling at the same speed, that is, the speed of the rotor, and their difference in mass causes separation. In the fractionating, uninterruptedly-continuous relatively long path still of my invention, each molecule is a freely moving individual particle constrained only by collision with other molecules and inner walls of a coil. The laws of centrifugal force and motion are based upon the following formula:

$$F = ma = m\frac{v^2}{r}$$

$$a = \frac{v^2}{r}$$

Where F is the force, a is acceleration, v is the velocity, m is the mass, and r is the radius of the coil. It is thus apparent that the squared velocity factor is of primary importance and that the lighter, faster, lower boiling point molecules will be accelerated to outer, hotter portions of the coil and heavier, slower, higher boiling point molecules having lesser acceleration will be forced by mass action from successive collision with the more energetic, faster moving light molecules toward the inner cold wall where they are subjected to a condensing action.

When heat is applied to a mixture of substances in liquid form, it is recognized that the resulting rise in temperature produces a rise of vapor pressure for all the constituents, and that increasing temperature increases the vapor pressures of lower boiling components more rapidly than those of higher boiling components. Thus, the vapor or gas will contain a greater portion of the lower boiling components than the original mixture and as a result a mixture of vapors or gases within the coil of a molecular still such as illustrated will be richer in lower boiling components than either the original mixture of liquids or the condensed reflux in the coil.

At any given temperature when a complex substance in the form of a liquid is in contact with its vapor the composition of the vapor tends to become proportional to the vapor pressures of the individual components of the liquid. If the vapor is removed as it is produced the remaining liquid will then become progressively poorer in those components of higher vapor pressures, i. e., those having lower boiling points.

Selective vaporizing action will be facilitated by maintaining a sharp temperature gradient across the coil which will in effect provide in the reflux liquid a hot region leading to a larger proportionate removal of lower boiling components and a cold region leading to a larger proportionate retention of high boiling components. Although a coil as utilized in my invention is open at its opposite ends, it can be considered as providing a closed molecular path throughout the length of which ascending vapors are in uninterrupted contact with the surface of descending reflux liquids, certain portions of which are in the form of a film approaching molecular thinness.

It will be apparent that in employing my invention there will be a temperature gradient curve for the hot wall of the coil which will be determined primarily by the temperature of the vapors within the coil. A second curve for the cold wall will be shaped in accordance with the temperature of the cooling wall within any given level of the cooling jacket. However, due to heat conductivity between the two walls, that is, through the metal walls of the coil, there will be a superimposed temperature gradient which will in turn cause an increment of separating action to obtain throughout the length of the coil.

It is definitely known that in any enclosed space filled with a mixture of gases or vapors across which there is maintained a temperature gradient there will be a migration of heavier molecules toward the cooler portion of the coil and an opposite migration of the lighter molecules toward the hotter portion thereof. As a general rule, particularly as to substances within the petroleum series, the heavier molecules are those which have higher boiling points, lower average molecular velocity, and lower vapor pressure.

While I do not desire to be restricted to the theories herein set forth, it is my belief that the accurate fractionation in accordance with my invention of a mixture of vapors of condensing points differing but slightly from each other is at least in part due to action in accordance with one or both of the above stated theories.

It will be apparent to those skilled in the art that in accordance with my invention the substances or fractions introduced as a liquid through the inlet pipe 23 are partly vaporized by the still 21 and enter the tower 12 as a mixture of gases having a relatively wide boiling point range as made up by the more narrow boiling point ranges of the individual substances or fractions represented by such gas mixture. Substances not vaporized will flow downwardly toward the bottom of the still 21, from which point they may be removed by pipe 21a and sent through an apparatus corresponding to the one described for further treatment. As the gas mixture moves upwardly along the confined passage provided by the coil helix 24, the substance having the highest boiling point is the first condensed as a liquid which then flows by gravity toward the lower end of the coil. As the gaseous column progresses upwardly along the coil, substances of progressively lower boiling points, starting with the substance of highest boiling point are selectively condensed out of the column and flow toward the lower end of the coil. I have determined that for a given mixture of gases representing a number of substances or fractions of different boiling points, that the substance or fraction of lowest boiling point will move or flow out of the confined passage as a substantially pure substance through the riser pipe 25. It then can be condensed in any suitable condenser, such as the conventional condenser shown in Figures 1, 1A, and 2, into liquid form and collected at the outlet pipe 30. In the condenser shown, the gas representing such pure substance of lower boiling point or, in other words, of lower condensing point, flows through vertical tubes about which a cooling medium passes. The flow is from an upper to a lower header. Uncondensed gases may leave the lower header through the pipe 31.

In a single batch utilization, after the first fraction or substance of lowest or lower boiling point and lowest or lower condensing point has passed through the still, the temperature in the still then rises to the boiling temperature of the next highest or higher fraction or substance contained in the mixture of gases; this substance then flows out through the riser pipe 25 until it is exhausted.

It will be apparent to those skilled in the art that the novel features of my invention may be employed in a continuous operation wherein a

*series of stills are provided, each one taking off successively higher boiling substances or fractions of the mixture used. It can also be used in connection with batch distillation where one still is employed to successively distill off fractions or substances of successively higher boiling points starting with a substance of lower or lowest boiling point of a mixture employed. When speaking of vapors or gases in the claims, I have particular reference to a vapor or gaseous phase of a mixture of substances or of a liquid made up of a mixture of such substances, i. e. vapors in liquid form.*

*It will thus be apparent that a desired substance or substances can be collected at either end of the still. It will also be apparent, in view of the previous explanation, that taps may be employed along the coil to remove substances or fractions of narrower boiling point ranges than the original vapor mixture as they are progressively condensed in the coil.*

*As shown and described, I preferably so mount the coil 24 that adjacent substantially horizontal wall portions of its convolutions are in a heat conducting relationship with respect to each other. This serves to insure the release of any lower boiling point substance in gaseous or vapor form that may be entrapped in a higher boiling point fraction, substance, or substances that have condensed in a particular convolution or turn of the coil, and that normally flow downwardly as reflux liquid toward the lower end of the confined path provided by the coil. It will be noted in Figures 1 and 3 that the cooling jacket 32 has a substantially spiral-line cooling-surface contact with the coil 24, in other words, there is a localized line contact between walls of the convolutions and the vertical wall of the cooling jacket 32. This is preferred over the arrangement shown, for example, in Figure 4.*

*It will be apparent than an important feature of my invention makes possible selective separation of more volatile components of a mixture of vapors by condensing and returning less volatile components of the vapor mixture and in passing the more volatile components in vapor form upwardly out of the still and into a condenser.*

*With reference to the example in column 4 of this specification, the length of the coil is $\pi DT$ where $\pi=3.1416$, $D$=the diameter of the coil, and $t$=the number of turns. That is, the coil length is $3.14\times3\times40$ or about 376 feet.*

*It will be apparent from a study of the two forms of apparatus utilizing my invention and shown in Figures 1 and 3 of the drawings, that the insulating material along the outer side of the free or unobstructed helical passageway, or in other words, along the side opposite to the actively-cooled or axis side thereof (see the jacket 32 of the construction shown in Figure 1) will shield or so protect the passageway provided by the helical coil 24, as to substantially inhibit or eliminate heat loss to the surrounding atmosphere on this particular side along the full extent of the upwardly flowing gases, and will maintain a relatively high condensation-inhibiting temperature along the full extent of this flow side of the gases. In Figure 3 the heating medium serves the same purpose, in that the flow of such medium acts like the insulating material of the structure of Figure 1, to shield or protect the outer side of the upward flow of the gases from heat loss along the passageway provided by the helical coil 46. The opposite or inner (axis) side of the passageway is, on the other hand, subjected to a cooling medium for selectively condensing-out the gases of progressively lower boiling points, as the mixture of heat-containing gases moves upwardly along the helical passageway. The steps of cooling one side of the closed helical passageway and of insulating or shielding the other side thereof, thus subjects the upwardly flowing gases to a sharp heat gradient across its convolutions. It will be noted that the temperature gradient across the coil prevents the establishment of an equilibrium in any portion of the coil.*

I claim as my invention:

[1. A process of selectively condensing a liquid having a narrow boiling point range from a mixture of gases containing said liquid in its gaseous phase, said mixture having a wider boiling point range than said liquid, which comprises: passing said mixture of gases into the lower end of a closed passage of helical contour so disposed that any liquid condensed in said passage flows by gravity to the lower end thereof, and the mixture of gases rises through the passage; and cooling a portion of the wall of the helical passage on the side nearest the axis of the helix to a sufficient degree to cause a condensation from said mixture of the desired liquid, that portion of the mixture not so condensed passing while still in gaseous form out of said passage.]

[2. A process of selectively condensing a liquid having a narrow boiling point range from a mixture of gases containing said liquid in its gaseous phase, said mixture having a wider boiling point range than said liquid, which comprises: passing said mixture of gases into the lower end of a closed passage of helical contour so disposed that any liquid condensed in said passage flows by gravity to the lower end thereof, and the mixture of gases rises through the passage; and cooling a portion of the wall of the helical passage on the side nearest the axis of the helix to a lower temperature than the remainder of said wall and to a sufficient degree to cause a condensation from said mixture of the desired liquid, that portion of the mixture not so condensed passing while still in gaseous form out of said passage.]

[3. A process of selectively condensing a liquid having a narrow boiling point range from a mixture of gases containing said liquid in its gaseous phase, said mixture having a wider boiling point range than said liquid, which comprises: passing said mixture of gases into the lower end of a closed passage of helical contour so disposed that any liquid condensed in said passage flows by gravity to the lower end thereof, and the mixture of gases rises through the passage; and cooling a portion of one vertical wall of the helical passage to a sufficient degree to cause a condensation from said mixture of the desired liquid, that portion of the mixture not so condensed passing while still in gaseous form out of said passage.]

[4. A process of selectively condensing a liquid having a narrow boiling point range from a mixture of gases containing said liquid in its gaseous phase, said mixture having a wider boiling point range than said liquid, which comprises: passing said mixture of gases into the lower end of a closed passage of helical contour so disposed that any liquid condensed in said passage flows by gravity to the lower end thereof, and the mixture of gases rises through the passage; and cooling a portion of one vertical wall of the helical passage to a lower temperature than the remainder of said wall and to a sufficient degree to cause condensation from said mixture of the desired liquid, that portion of the mixture not so condensed passing while still in gaseous form out of said passage.]

*5. A fractionating process of selectively condensing-out progressively lower boiling point gases in liquid form from a mixture of gases having a wider boiling point range and containing gases of progressively lower boiling points which comprises, freely flowing a heat-containing mixture of the gases upwardly along an unobstructed-closed-helical and upwardly-extending passageway, cooling the upwardly flowing gases along one side of the helical passageway and selectively condensing-out the gases of progressively lower boiling points along such side of the upward extent of the helical passageway, substantially eliminating heat loss to the surrounding atmosphere of the upwardly-flowing gases along an opposite side of the helical passageway and maintaining a condensation - inhibiting temperature therealong, thereby subjecting the mixture of upwardly-flowing heat-containing gases to a sharp heat gradient across convolutions of the helical passageway and between the above-mentioned opposite sides of the upward flow of the mixture of gases, freely flowing the condensed-out gases by gravity downwardly along the helical passageway, and continuing the condensing-out action until the gases of progressively lower boiling points are condensed-out from the mixture of gases.*

*6. A fractionating process of selectively condensing-out progressively lower boiling point gases in liquid form from a mixture of gases having a wider boiling point range and containing gases of progressively lower boiling points which comprises, freely flowing a heat-containing mixture of the gases upwardly along an unobstructed-closed-helical and upwardly-extending passageway, cooling the upwardly-flowing gases along an inner side of the helical passageway and selectively condensing-out the gases of progressively lower boiling point gases along such side for the upward extent of the helical passageway, insulating the upwardly-flowing gases along an outer side of the helical passageway from the surrounding atmosphere and maintaining a relatively high condensation - inhibiting temperature therealong, thereby subjecting the mixture of upwardly-flowing-heat-containing gases to a sharp heat gradient across convolutions of the helical passageway and between the above-mentioned opposite sides of the upward flow of the mixture of gases, freely flowing the condensed-out gases by gravity downwardly along the helical passageway, and continuing the condensing-out action until the gases of progressively lower boiling points are condensed-out from the mixture of gases.*

*7. A fractionating process of selectively separating substantially pure substances of progressively lower boiling points which comprises, freely flowing the substances in the form of gases in a mixture of heat-containing gases upwardly along an unobstructed-closed-helical and upwardly-extending passageway, cooling the upwardly-flowing gases along an inner side of the helical passageway and selectively condensing-out gases along the upward extent thereof of progressively lower boiling points, substantially eliminating heat loss to the surrounding atmosphere of the upwardly-flowing gases along the upward extent of an outer side of the helical passageway and maintaining a condensation-inhibiting temperature therealong, thereby subjecting the upwardly flowing gases to a sharp heat gradient across convolutions of the helical passageway and between the above-mentioned inner and outer sides of the upward flow of gases, freely flowing the condensed-out gases by gravity downwardly along the helical passageway, and continuing the selective condensing-out action along the upward extent of the inner side of the helical passageway until the substances of progressively lower boiling points are condensed, and freely flowing the remaining portion of the mixture of gases out of an upper end of the helical passageway.*

*8. A fractionating process of selectively separating substantially pure substances of progressively lower boiling points which comprises, freely flowing the substances in the form of gases in a mixture of heat-containing gases upwardly along an unobstructed-closed-helical and upwardly-extending passageway, cooling the upwardly-flowing gases along an inner side of the helical passageway and selectively condensing-out gases along the upward extent thereof of progressively lower boiling points, substantially eliminating heat loss to the surrounding atmosphere along the upward extent of an outer side of the helical passageway and maintaining a condensation-inhibiting temperature therealong, thereby subjecting the upwardly flowing gases to a sharp heat-gradient across convolutions of the helical passageway and between the above-mentioned inner and outer sides of the upward flow of gases, and maintaining an effective heat-conducting relationship between the gases flowing upwardly along adjacent convolutions of the helical passageway.*

*9. A fractionating process of selectively separating substantially pure substances of progressively lower boiling points which comprises, freely flowing the substances in the form of gases in a mixture of heat-containing gases upwardly along an unobstructed-closed-helical and upwardly-extending passageway, cooling the upwardly-flowing gases along one side of the helical passageway and selectively condensing-out gases of progressively lower boiling points along the upward extent thereof, insulating the upwardly-flowing gases along an opposite side of the helical passageway from the surrounding atmosphere and maintaining a relatively high and condensation-inhibiting temperature therealong, thereby subjecting the upwardly flowing gases to a sharp heat gradient across convolutions of the helical passageway and between the above-mentioned opposite sides of the upward flow of gases, freely flowing the condensed-out gases by gravity downwardly along the helical passageway, continuing the selective condensing-out action along the upward extent of the helical passageway until all the substances of the mixture of gases except the lowest boiling point substance are condensed, and flowing the lowest boiling point substance as a gas out of an upper end of the passageway.*

*10. A fractionating process of selectively separating substantially pure substances of progressively lower boiling points which comprises, freely flowing the substances in the form of gases in a mixture of heat-containing gases upwardly along an unobstructed-closed-helical and upwardly-extending passageway, cooling the upwardly-flowing gases along an inner side representing an axis of the helical passageway and selectively condensing-out gases of progressively lower boiling points along the upward extent thereof, insulating the upwardly-flowing gases along an outer and opposite side of the helical passageway from the surrounding atmosphere and maintaining a rela-*

*tively high and condensation-inhibiting temperature therealong, thereby subjecting the upwardly-flowing gases to a sharp heat-gradient across convolutions of the helical passageway and between the above-mentioned opposite sides of the upward flow of gases, freely flowing the condensed-out gases by gravity downwardly along the upward extent of the helical passageway until all the substances of the mixture of gases except the lowest boiling point substance are condensed, and flowing the lowest boiling point substance as a gas out of an upper end of the passageway.*

*11. A fractionating process of selectively separating substantially pure substances of progressively lower boiling points which comprises, freely flowing the substances in the form of gases in a mixture of heat-containing gases upwardly along an unobstructed-closed-helical and upwardly extending passageway, cooling the upwardly-flowing gases along an inner side representing an axis of the helical passageway and selectively condensing-out gases of progressively lower boiling points along the upward extent thereof, insulating the upwardly-flowing gases along an outer and opposite side of the helical passageway from the surrounding atmosphere and maintaining a relatively high and condensation-inhibiting temperature therealong, thereby subjecting the upwardly-flowing gases to a sharp heat-gradient across convolutions of the helical passageway and between the above-mentioned opposite sides of the upward flow of gases, freely flowing the condensed-out gases by gravity downwardly along the upward extent of the helical passageway until all the substances of the mixture of gases except the lowest boiling point substance are condensed, flowing the lowest boiling point substance as a gas out of an upper end of the passageway, and separately condensing the gas representing the gas having the lowest boiling point substance.*

FLORIAN V. ATKESON.

REFERENCES CITED

The following references are of record in the file of this patent or the original patent:

UNITED STATES PATENTS

| Number | Name | Date |
|---|---|---|
| 890,417 | Eyermann | June 9, 1908 |
| 1,249,480 | Pflugfelder | Dec. 11, 1917 |
| 1,563,718 | Brown | Dec. 1, 1925 |
| 1,568,157 | Hess | Jan. 5, 1926 |
| 1,700,928 | Fawkes | Feb. 5, 1929 |
| 1,799,081 | Blomquist | Mar. 31, 1931 |
| 1,924,954 | Muller | Aug. 29, 1933 |
| 1,936,524 | Placek | Nov. 21, 1933 |
| 1,942,858 | Hickman | Jan. 9, 1934 |
| 1,946,467 | Bergholm et al. | Feb. 13, 1934 |
| 1,956,133 | Rosenbled | Apr. 24, 1934 |
| 1,990,831 | Lea | Feb. 12, 1935 |
| 2,044,996 | Podbielniak | June 23, 1936 |
| 2,147,671 | Pratt | Feb. 21, 1939 |
| 2,182,566 | Lavigne | Dec. 5, 1939 |
| 2,224,621 | Voorhees | Dec. 10, 1940 |
| 2,268,134 | Clusius | Dec. 30, 1941 |

FOREIGN PATENTS

| Number | Country | Date |
|---|---|---|
| 492,241 | Great Britain | Sept. 16, 1938 |